United States Patent [19]

Engan et al.

[11] Patent Number: 5,022,732

[45] Date of Patent: Jun. 11, 1991

[54] FIBER OPTIC INTERMODE COUPLING SINGLE SIDEBAND FREQUENCY SHIFTER

[75] Inventors: Helge E. Engan, Trondheim, Norway; Byoung Y. Kim, Menlo Park, Calif.; James N. Blake, Phoenix, Ariz.; Herbert J. Shaw, Stanford, Calif.

[73] Assignee: The Board of Trustees of the Leland Stanford Junior University, Stanford, Calif.

[21] Appl. No.: 342,947

[22] Filed: Apr. 25, 1989

Related U.S. Application Data

[63] Continuation-in-part of Ser. No. 48,142, May 11, 1987, Pat. No. 4,832,437, which is a continuation-in-part of Ser. No. 520,513, Jan. 17, 1986, abandoned, and a continuation-in-part of Ser. No. 909,503, Sep. 19, 1986, abandoned, which is a continuation-in-part of Ser. No. 820,513, Jan. 17, 1986, abandoned.

[51] Int. Cl.$^5$ .......................... G02B 6/26; G02B 6/02
[52] U.S. Cl. .............................. 350/96.15; 350/96.29; 350/358
[58] Field of Search ............... 350/96.10, 96.15, 96.29, 350/96.30, 320, 358; 250/227

[56] References Cited

U.S. PATENT DOCUMENTS

| | | | |
|---|---|---|---|
| 3,406,358 | 10/1968 | Seidel et al. | 350/96.29 |
| 3,625,589 | 12/1971 | Snitzer | 350/149 |
| 3,645,603 | 2/1972 | Smith | 350/149 |
| 3,931,518 | 1/1976 | Miller | 250/227 |
| 3,936,144 | 2/1976 | Caton | 350/96.15 |
| 4,067,643 | 1/1978 | Sugimura et al. | 350/96.15 |
| 4,086,484 | 4/1978 | Steensma | 250/199 |
| 4,236,786 | 12/1980 | Keck | 350/96.15 |
| 4,312,562 | 1/1982 | Segawa et al. | 350/96.15 |
| 4,319,186 | 3/1982 | Kingsley | 350/96.29 |

(List continued on next page.)

FOREIGN PATENT DOCUMENTS

153124 8/1985 European Pat. Off. .
57-15861 9/1982 Japan .

OTHER PUBLICATIONS

A. A. Godil et al., "All Fiber Acoustooptic Phase Modulators Using Zinc Oxide Films on Glass Fiber", *Journal of Lightwave Technology*, vol. 6, No. 10, Oct. 1988, pp. 1586–1590.

H. Engan et al., "Propagation and Optical Interaction of Guided Acoustic Waves in Two-Mode Optical Fibers", *Journal of Lightwave Technology*, vol. 6, No. 3, (List continued on next page.)

*Primary Examiner*—Akm Ullah
*Attorney, Agent, or Firm*—Knobbe, Martens, Olson & Bear

[57] ABSTRACT

An optical fiber is subjected to a series of traveling flexural waves propagating along a length of the fiber. At least a portion of an optical signal propagating within the optical fiber in a first propagation mode is coupled to a second propagation mode. The optical signal in the second propagation mode has a frequency which is equal to either the sum of or the difference between the frequency of the optical signal in the first propagation mode and the frequency of the traveling flexural waves. The frequency of the optical signal in the second propagation mode is shifted upward or downward from the frequency of the optical signal in the first propagation mode as determined by the direction of propagation of the first optical signal with respect to the direction of propagation of the traveling flexural waves, and as also determined by whether the phase propagation velocity of the optical signal in the first propagation mode is greater than or less than the propagation velocity of the optical signal in the second propagation mode. An acoustic wave is induced in a generator having a gradual tapered cross-section. The generator preferably has the shape of a horn and is coaxially mounted with said optical fiber, so as to suppress the acoustic wave induced in the optical fiber in the reverse direction.

34 Claims, 5 Drawing Sheets

U.S. PATENT DOCUMENTS

| | | | |
|---|---|---|---|
| 4,684,215 | 8/1987 | Shaw et al. | 350/96.15 |
| 4,729,620 | 4/1988 | Pavlath | 350/96.15 |
| 4,735,484 | 4/1988 | Fesler | 350/96.29 |
| 4,735,485 | 4/1988 | Shaw et al. | 350/96.29 |
| 4,793,676 | 12/1988 | Risk | 350/96.15 X |
| 4,832,437 | 5/1989 | Kim et al. | 350/96.15 |
| 4,895,421 | 1/1989 | Kim et al. | 350/96.15 |

OTHER PUBLICATIONS

Mar. 1988, pp. 428–436.

Risk et al., "Acoustic Fiber-Optic Modulators", *Proceedings of the IEEE Ultrasonics Sumposium*, Nov. 14–16, 1984, pp. 318–327.

Kino et al., "Acoustic Modulators for Optical Fibers", *Revue de Physique Appliquee*, vol. 20, No. 6, Paris, France, Jun. 1985, pp. 333–340.

R. N. Thurston, "Elastic Waves in Rods and Clad Rods", *Journal Acoustical Society America*, 64(1), Jul. 1978, pp. 1–37.

Lardat et al., "Applications of Edge-Bonded Transducers to SAW Components", *Proceedings of the IEEE*, vol. 64, No. 5, May 1976, pp. 627–630.

D. Bancroft, "The Velocity of Longitudinal Waves in Cylindrical Bars", *Physical Review*, vol. 59, Apr. 1, 1941, pp. 588–593.

H. McSkimin, "Propagation of Longitudinal Waves and Shear Wves in Cylindrical Rods at High Frequencies", *J. Acoustical Society of America*, vol. 28, No. 3, May 1956, pp. 484–494.

Kim et al., "All-Fiber Acousto-Optic Frequency Shifter," *Optics Letters*, vol. 11, No. 6, Jun. 1986, New York, U.S.A.

L. Pochhammer, "U er die Fortpflanzungsgeschwindig-keiten kleiner Schwingungen in einem unbegrenzten isotropen Kreiscylinder," *Journal fur Reine und Angewandte Mathetmatik*, vol. 81, 1976, pp. 324–336.

E. G. Cook et al., "Surface Waves at Ultrasonic Frequencies", *ASTM Bulletin*, pp. 81–84, May 1954.

F. Gfeller, "Electroacoustic Transducers for Optical Fiber Modulator and Tap", *IBM Technical Disclosure Bulletin*, vol. 21, No. 2, Jul. 1978, pp. 813–814.

F. Gfeller et al., "Modulator and Tap for Optical Fiber Systems", *IBM Technical Disclosure Bulletin*, vol. 21, No. 5, Oct. 1978, pp. 2014–2015.

M. R. Layton et al., "Optical Fiber Acoustic Sensor Utilizing Mode-Mode Interference", *Applied Optics*, vol. 18, No. 5, Mar. 1, 1979, pp. 666–670.

R. Ulrich et al., "Single-Mode Fiber-Optical Polarization Rotator", *Applied Optics*, vol. 18, No. 11, Jun. 1, 1979, pp. 1957–1861.

F. Heismann et al., "Integrated-Optical Frequency Translator with Stripe Waveguide", *Applied Physics Letter* 45(5), Sep. 1, 1984.

K. Kitayama et al., "Stress-Induced Frequency Funing for Stimulated Four-Photom Mixing in a Birefringent Single-Mode Fiber", *Applied Physics Letter* 41(4), Aug. 15, 1982, pp. 322–324.

K. Wong et al., "Electro-Waveguide Frequency Translator in $LiNbO_3$ Fabricated by Proton Exchange", *Optics Letters*, vol. 7, No. 11, Nov. 1982, pp. 546–548.

R. H. Kingston, "Broadband Guided-Wave Optical Frequency Translator Using an Electro-Optical Bragg Array", *Applied Physics Letter* 42(9), May 1, 1983, pp. 759–761.

K. Nosu et al., "Acousto-Optic Frequency Shifter for Single-Mode Fibres", *Naval Research Laboratory*, Washington, D.C. 20375.

K. Nosu et al., "Acousto-Optic Phase Modulator for Single Mode Fibers", *Naval Research Laboratory*, Washington D.C. 20375.

R. C. Youngquist et al., "Birefringent-Fiber Polarization Coupler", *Optical Society of America*, Aug. 10, 1983.

W. P. Risk et al., "Acousto-Optic Birefringent Fiber Frequency Shifter", Integrated and Guided Wave Optics Conference, Kissimmee, Fla., Apr. 24–26, 1984.

H. Taylor et al., "Bending Effects in Optical Fibers", *Journal of Lightwave Technology*, vol. 2, No. 5, Oct. 1975.

L. M. Johnson, "Integrated-Optical Components for Fiber Gyroscopes", *SPIE*, vol. 566, Fiber Optic Laser Sensors III, (1985).

R. C. Youngquist et al., "All-Fibre Components Using Periodic Coupling", *IEEE Proceedings*, vol. 132, Pt. J., No. 5, Oct. 1985.

R. L. Baer et al., "Conical Transducer for Generation of Acoustic Waves in Fluids", *Applied Physics Letters* 42(7), Apr. 1, 1983.

R. C. Youngquist et al., "Two-Mode Fiber Modal Coupler", *Optics Letters*, vol. 9, p. 177, May 1984.

W. V. Sorin et al., "Highly Selective Evanescent Modal Filter for Two-Mode Optical Fibers", *Optics Letters*,

OTHER PUBLICATIONS vol. 11, No. 9, Sep. 1986.
W. P. Risk, "Single-Sideband Frequency Shifting in Birefringent Optical Fiber", *SPIE*, vol. 478—Fiber Optic and Laxer Sensor II, (1984).
Meeker et al., "Guided Wave Propagation in Elongated Cylinders and Plates", *Physical Acoustic-Principles and Methods*, vol. 1A, W. P. Mason, editor, Academic Press, New York, 1964, pp. 111-167.
R. Davies, "A Critical Study of the Hopkinson Pressure Bar", *Philosphical Transactions of the Royal Society of London*, vol. 240, Jan. 8, 1948, pp. 375-457.
Heismann et al., "Integrated-Optical Single-Sideband Modulator and Phase Shifter", *IEEE J. of Quantum Electronics*, vol. QE-18, No. 4, 4/82, pp. 767-771.
Brooks et al., "Active Polarization Coupler for Birefringent Fiber", *Optics Letters*, vol. 9, No. 6, Jun. 1984, pp. 249-251.
M. Onashi et al., "Phase-Matched Light Amplification by Three-Wave Mixing Process in a Birefringent Fiber Due to Externally Applied Stress", *Applied Physics Letters*, vol. 41, No. 12, Dec. 15, 1982.
Youngquist, "Single Sideband Frequency Shifting", *Ph. D. Thesis: Loss and Periodic . . . Couplers*, Chapter 7, Stanford University, Jun. 1984, pp. 79-88.

FIBER OPTIC INTERMODE COUPLING SINGLE SIDEBAND FREQUENCY SHIFTER

RELATED APPLICATIONS

This application is a continuation-in-part of U.S. patent application Ser. No. 048,142, filed on May 11, 1987, now U.S. Pat. No. 4,832,437 which is a continuation-in-part of U.S. patent application Ser. No. 520,513, filed on Jan. 17, 1986, now abandoned, and is also a continuation-in-part of U.S. patent application Ser. No. 909,503, filed on Sept. 19, 1986, now abandoned, which is also a continuation-in-part of U.S. patent application Ser. No. 820,513, filed on Jan. 17, 1986 now abandoned. The three prior applications are assigned to the assignee of this application.

FIELD OF THE INVENTION

The present invention relates generally to fiber optic devices and, more specifically, to devices which couple light energy from an optical signal input into an optical fiber in one mode at one frequency to a different mode at a shifted frequency.

BACKGROUND OF THE INVENTION

Fiber optic frequency shifters are useful devices for a variety of fiber optic sensor and signal processing applications, such as in fiber optic gyroscopes and the like. It has been shown, for example in U.S. Pat. No. 4,684,215, entitled "Single Mode Fiber Optic Single Sideband Modulator," filed on Nov. 30, 1983, and assigned to the assignee of the present application, that light launched in one propagation mode of a fiber can be coupled to another propagation mode and shifted in frequency by propagating an acoustic wave along the length of the fiber to cause a periodic stress of the fiber. The light is shifted in frequency by an amount equal to the frequency of the acoustic wave. The U.S. Pat. No. 4,684,215 is hereby incorporated herein by reference.

As set forth in the above-referenced patent, if the acoustic wave propagates along the fiber in the same direction as the direction of an optical signal propagating through the fiber, light traveling in a first propagation mode in the fiber at a first phase velocity and at a first frequency is coupled to a second propagation mode at a second phase velocity higher than the first phase velocity and is shifted downward in frequency. Similarly, if the light is originally propagating in the fiber in a faster propagation mode, the light is coupled to a slower propagation mode at a higher frequency. On the other hand, if the acoustic wave propagates along the fiber in a direction opposite the direction of an optical signal propagating through the fiber, light traveling in a slower propagation mode is coupled to a faster propagation mode and is shifted upward in frequency. Similarly, light traveling in a faster propagation mode opposite the direction of propagation of an acoustic wave is coupled to a slower propagation mode and is shifted downward in frequency.

For optimal coupling to occur in the frequency shifter described in the above-referenced patent, the acoustic wavelength, in the direction of propagation of the optical signal through the fiber, is preferably substantially equal to a characteristic of the fiber, referred to as the beat length of the fiber for a given optical signal traveling through the fiber at a specified frequency. As is well known, when light travels through a fiber in more than one propagation mode, the light travels through the fiber at a different phase velocity for each of the different propagation modes. Light traveling in the slower propagation mode travels at a lower phase velocity than light in a faster propagation mode. Thus, a light signal having a fixed frequency will have an effective wavelength in the faster propagation mode longer than it has in the slower propagation mode. As the light propagates down the length of the fiber, a phase difference will thus develop between the light in the two modes. At spatially periodic distances, the light in the two modes will be in phase. The distance between successive locations where the light is in phase is referred to as the beat length of the fiber for the two modes at a specified frequency.

For the devices discussed in the above-mentioned patent, the beat length preferably matches the acoustic wavelength in order to achieve optimal optical coupling of energy between the modes. The light propagating along a fiber in one propagation mode is converted to light propagating in a second propagation mode by applying a periodic, traveling wave, compressive force along a segment of the length of the fiber. A more complete description of this technique is found in "Single-Sideband Frequency Shifting in Birefringent Optical Fiber," W. P. Risk, et al., *SPIE Volume 478 - Fiber Optic and Laser Sensors II* (1984), pp. 91–97, which is hereby incorporated herein by reference. This article will be referred to as the Risk article.

Background information on frequency shifting by excitation of an acoustic wave along a multimode fiber may be found in the aforementioned U S. patent applications Ser. No. 820,513, now abandoned Ser. No. 909,503 now abandoned and Ser. No. 048,142 now U.S. Pat. No. 4,832,437. These prior patent applications are hereby incorporated herein by reference. The principal characteristics of acousto-optic coupling are now summarized hereinbelow.

It has been shown that acoustic flexural waves propagating along an optical two-mode fiber provide an efficient coupling between the modes. This effect was demonstrated in a frequency shifter configuration, although many other applications are conceivable. These include amplitude modulators, phase modulators, switches and switchable couplers.

A multimode fiber is a fiber which can support more than one spatial propagation mode for an optical signal. The fundamental mode, $LP_{01}$, has the slowest phase propagation velocity of the spatial propagation modes. The portion of an optical signal traveling in the $LP_{01}$ mode has its optical energy concentrated near the center of the core of the optical fiber. Light traveling in the second order $LP_{11}$ mode, or odd mode, has an electrical field amplitude distribution having two maxima displaced away from the center of the core. In a substantially straight, unstressed optical fiber, the $LP_{01}$ mode and the $LP_{11}$ mode are considered to be orthogonal propagation modes, such that light traveling in one of the modes is not ordinarily coupled to the other mode.

It has been found that if a fiber is bent, a portion of the optical energy entering the bent portion of the fiber in one mode (for instance, the first order $LP_{01}$ mode) is coupled to the orthogonal mode (for instance, the second order $LP_{11}$ mode) as the optical energy propagates through the bent portion of the fiber. It has been discovered that light propagating along such a fiber may be converted from one mode to the other by applying a static periodic microbending force along a segment of the fibers length which is properly matched to the characteristic length L of the fiber. The distance L, also called the beat length, is calculated as $L = 2\pi/\Delta k$, where $\Delta k$ is the difference in the propagation constants of the two modes along the fiber.

It has also been found that if an optical frequency is selected to provide a minimum beat length for the first and second order propagation modes, the frequency of the optical signal can be varied substantially above and below the center frequency without causing a significant change in the difference between the propagation constants of the two modes. When an optical fiber is formed into a series of periodic microbends which are spaced by a beat length, the coupling between the two spatial propagation modes of an optical signal traveling through the fiber have a cumulative effect. This effect has been demonstrated in theory in "Bending Effects in Optical Fibers," Henry F. Taylor, *Journal of Light Wave Technology*, vol. LT-2, pp. 616-633 (1984). This article is hereby incorporated herein by reference.

The propagation of an acoustic wave through a fiber not only causes light to be coupled from one propagation mode to another propagation mode, but also allows a shift in frequency. This is disclosed in detail in the Risk article. While this article discusses coupling between polarization modes in a birefringent fiber, a similar effect has been described for coupling between spatial modes in multimode fibers when an externally applied stress is applied to the fiber. See, for example, the above-referenced U.S. Pat. No. 4,684,215. Thus, an optical signal exiting from one end of the fiber exits at a frequency which is shifted in frequency from the frequency which was input at the first end portion of the fiber. This frequency is equal to the frequency input plus or minus the frequency of the signal applied to the transducer used to generate the acoustic wave. Whether the frequency of the acoustic wave is added to or subtracted from the frequency of the optical input signal is determined by whether the signal is input in the first order mode or the second order mode, and whether or not the optical signal is propagating in the same direction as the propagating microbend.

In the embodiment disclosed in the aforementioned prior U.S. patent application Ser. No. 048,142, a transducer in the form of a horn is positioned adjacent an optical fiber and fused thereto to provide good acoustic contact between the fiber and one end of the horn transducer. In this embodiment, the horn transducer is substantially perpendicular to the propagation axis of the light wave in the optical fiber. This horn transducer is tapered, having a diameter substantially larger at one end than the diameter at the other end. A piece of piezoelectric material is bonded to the distal end, i.e., large diameter end, of the horn. When an electrical signal is applied to the piece of piezoelectric material, this material expands and contracts so as to generate a series of acoustic waveforms propagating through the horn from the distal end (large diameter) to the proximal end (smaller diameter). The acoustic energy of this transducer is coupled directly to the optical fiber to cause movement transverse to the longitudinal axis of the fiber, thus inducing a vibration in the fiber which propagates away from the coupling location as a traveling flexural wave or traveling microbend. The tapered horn acts as an acoustic funnel which concentrates the acoustic energy applied at the distal end of the horn. In this embodiment, the optical fiber also comprises a damper proximate to the location where the transducer is fused to the fiber, to limit the travel of the microbend in the fiber to a single direction. This damper is typically formed of damping material which surrounds the fiber at a location proximate to the location at which the horn contacts the fiber. The damper is usually supported by a support block.

SUMMARY OF THE INVENTION

According to the present invention in a first aspect, there is disclosed an apparatus for coupling optical energy between optical propagation modes in an optical fiber, comprising an optical fiber having a longitudinal axis, the optical fiber supporting a first optical propagation mode and a second optical propagation mode for an optical signal propagating therein. The coupling apparatus of the present invention further comprises a generator connected to the fiber such that the generator produces a flexural wave which propagates in the optical fiber, the energy of the flexural wave being confined to the optical fiber. The flexural wave has a frequency, a propagation velocity and a wavelength, the wavelength of the flexural wave being a function of the frequency and the propagation velocity, and being selected to cause coupling of light from one of the modes to the other of the modes. The generator of the flexural wave has a longitudinal axis substantially coaxial with the longitudinal axis of the optical fiber.

The generator may comprise a single transducer or a plurality of transducers. It preferably comprises an elongated member having a first end mechanically coupled to the optical fiber and having a second end disposed away from the first end, the second end being mounted around the optical fiber, the second end having at least one transducer distally disposed thereon. The transducer is responsive to an electrical signal applied thereto to generate an acoustic wave which propagates from the second end of the member to the first end of the member to thereby induce the flexural wave in the optical fiber.

The second end of the member is preferably larger than the first end of the member so that the acoustic energy per unit area applied to the optical fiber is greater than the acoustic energy per unit area excited in the second end of the member by the transducer. The transducer typically excites an acoustic wave at the second end, the member converting the energy of the acoustic wave to provide a flexural acoustic wave at the first end of the member.

The member advantageously comprises a cylinder which is hollow at the second end and is solid at the first end, the transition between the hollow end and the solid end being a smooth and gradual taper. It may also comprise damping material, the damping material surrounding the optical fiber and suppressing the flexural acoustic wave in a direction opposite the direction of propagation of the optical signal.

In the preferred embodiment of the present invention, the member is substantially collinear with the optical fiber, the member being mounted so that the member suppresses any acoustic wave propagating in the opposite direction.

The coupling apparatus of the present invention preferably comprises a split block housing assembly, the housing assembly comprising a rear housing part and a front housing part, the rear housing part comprising an inner sleeve, the inner sleeve surrounded by the inner surface of the generator at the second end, the front housing part being removably mounted on the rear housing part. In this embodiment, the generator and the fiber are supported coaxially by the split block housing assembly.

It is advantageous that the front housing part be bonded to the fiber by means of an adhesive. The member may comprise two transducers distally mounted on the second end of the member. These distally mounted transducers are typically driven in opposition of phase by an electrical source, which can be an AC electrical source.

If the member comprises a plurality of transducers, these are driven by an electrical source at intervals selected so as to induce a flexural wave in the optical fiber.

The member may be formed from a single piece of material. The coupling apparatus of the present invention may comprise a damper, mechanically coupled to the optical fiber to prevent reflection of the flexural wave traveling in the optical fiber.

Preferably, the optical fiber includes a portion in which the diameter of the cladding of the optical fiber decreases from a larger diameter to a smaller diameter, the generator being coupled to the fiber at a location thereon at which the cladding diameter is sufficiently large to prevent coupling of light at the location.

The generator may also include means for adiabatically transforming the acoustic waves so as to excite a flexural wave in the fiber, the flexural wave causing coupling of light between the modes. In another embodiment of the present invention, the cross-section of the fiber varies in discrete increments. The transducer mounted on the generator typically comprises a piece of piezoelectric material.

The optical fiber is preferably a multimode optical fiber, but can be a birefringent single-mode fiber.

The optical energy, traveling in the first propagation mode at a first optical frequency in a first phase propagation velocity is preferably coupled to the second propagation mode at a second optical frequency and a second propagation velocity so that the second frequency is substantively equal to either the sum or difference of the first optical frequency and the frequency of the flexural wave.

The second optical frequency is typically equal to the first optical frequency plus the frequency of the flexural wave when the optical signal propagates in the same direction as the flexural wave and the first phase propagation velocity is greater than the second phase propagation velocity, and the second optical frequency is equal to the first optical frequency minus the frequency of the flexural wave when the optical signal propagates in the same direction as the flexural wave and the first phase velocity is less than the second phase velocity.

The first end of the member is preferably bonded to the circumference of the optical fiber with a low temperature melting glass having substantially a hardness similar to that of the optical fiber. The generator may be made of a material such as glass, such that the first end of the generator may be slowly melted and fused to the circumference of the fiber. The transducers are preferably separated from one another so as not to be electrically or mechanically connected together.

In the preferred embodiment of the present invention, the generator has the shape of a horn. The acoustic wave excited by the transducer at the second end is preferably a surface acoustic wave.

According to a second aspect of the present invention, there is disclosed a method of coupling optical energy between optical propagation modes in an optical fiber, comprising the steps of inputting an optical signal into an optical fiber having first and second optical propagation modes for signals propagating therein, the optical signal having a longitudinal axis; propagating a flexural wave within the optical fiber, the flexural wave having a frequency, propagation velocity and wavelength within the fiber, the wavelength within the fiber being determined by the frequency and the propagation velocity, the wavelength being selected so that a portion of the optical energy propagating in one of the propagation modes is coupled to the other propagation mode and exciting the flexural wave by propagating acoustic energy in a direction substantially parallel to the longitudinal axis of the fiber.

The method of the present invention preferably comprises the step of suppressing propagation of the acoustic wave in the optical fiber in a direction opposite to the direction of propagation of the optical signal. The step of inducing the acoustic wave may comprise the step of inducing a surface acoustic wave.

According to a third aspect of the present invention, there is disclosed a method of manufacturing a fiber optic frequency shifter comprising the steps of providing an optical fiber, surrounding a portion of the optical fiber with an acoustic medium, mounting and orienting acoustic transducers on the acoustic medium to generate an acoustic wave in the acoustic medium and driving the transducers on the acoustic medium so as to cause the acoustic wave to propagate in a direction substantially parallel to the longitudinal axis of the fiber, to thereby produce a flexural wave in the optical fiber.

The present invention is particularly advantageous insofar as it operates over a broad range of optical input frequencies. This advantage results from the use of the spatial propagation modes for coupling. As set forth above, the beat length of the two spatial propagation modes (for instance, the $LP_{01}$ and $LP_{11}$ modes) does not vary significantly over a broad optical frequency range. Thus, the beat length will substantially match the wavelength of the traveling microbend wave even when the optical frequency of the input optical signal is varied over a broad frequency range about a selected center frequency where the optical beat length and the wavelength of the traveling microbends match exactly.

The present invention is also particularly advantageous insofar as the energy required to cause the coupling between the modes is concentrated entirely within the fiber. Very little, if any, energy is wasted in the present invention. Thus, the mechanical energy generated by the transducer is utilized very efficiently.

Another advantage specific to the embodiment of the present invention resides in the packaging arrangement of the present invention which provides for a compact, portable and shock-resistant frequency shifter. The mechanical coupling between the generator and the fiber is not disturbed by any external mechanical vibration. This facilitates the transportation of the frequency shifter of the present invention and increases its mobility. Furthermore, the generator acts as a damper, and suppresses any flexural wave that would propagate in the reverse direction.

DETAILED DESCRIPTION OF THE PREFERRED EMBODIMENTS

Figure 1:
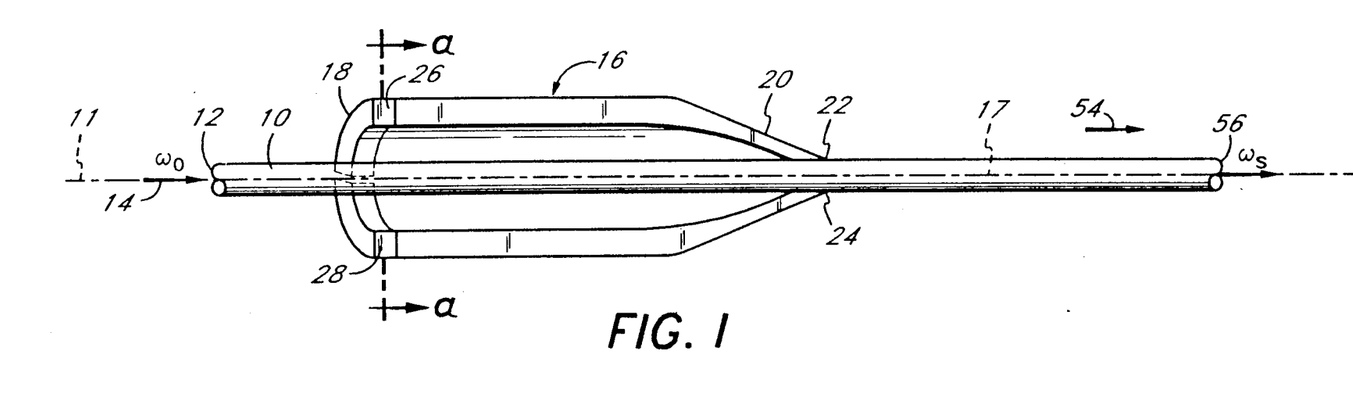
FIG. 1 illustrates a first embodiment of the present invention, comprising a generator coaxially mounted on an optical fiber.

Reference is now made to FIG. 1, which illustrates a first embodiment of the present invention. In this embodiment, there is represented a first optical fiber 10 having a first end portion 12 into which an optical signal, represented by an arrow 14, is introduced at a first angular frequency $\omega_0$. The fiber 10 has a longitudinal axis designated by the numeral 11. The fiber 10 is secured to a generator 16. The generator 16 preferably comprises a rod of fused quartz having a substantially circular cross-section throughout its length. The generator 16 has a longitudinal axis designated by the numeral 17. In the preferred embodiment of the present invention, the generator 16, in the shape of a horn, is mounted coaxially with the fiber 10 which passes through the generator 16. The longitudinal axis of the optical fiber 10 is thus substantially coaxial with the longitudinal axis of the generator 16. In the embodiment shown in FIG. 1, the axes 11 and 17 are identical. They may also be offset or at an angle to each another. The generator 16 is preferably cylindrical over a major portion of the length thereof. It comprises two ends, a first end portion 18 and a second portion 20 having a diameter which is substantially smaller than the diameter of the first end portion 18. In the preferred embodiment, the generator 16 is drawn from a silica glass tube, such that the generator is hollow in the center from the large diameter base to the neck at the end of the transition region. Suppression of the resonant effects can be performed by filling the hollow region with acoustic damping material. The hollow region can also be filled with a heat sink to limit any temperature fluctuations throughout the generator. The quartz rod is drawn into a form which gradually tapers from the diameter of the second end 20 to the smaller diameter of the first end 18. The second end 20 of the generator 16 has a diameter substantially equal to the diameter of the fiber 10. The tip 22 of the generator 16 may be bonded to the circumference of the fiber 10 with a low temperature melting glass having a hardness similar to that of the fiber 10. Alternatively, the generator 16 may be formed of an appropriate glass such that the tip 22 may be slowly melted and fused to the circumference of the fiber 10. As mentioned above, the generator 16 has a substantially circular cross-section throughout its length. Typically, in a preferred embodiment of the present invention, the diameter of the fiber 10 and the diameter of the second end 20 of the generator 16 are approximately equal to 100 micrometers. The generator 16 and the optical fiber 10 are fused together at a location 24 to provide good acoustic contact between the fiber 10 and the second end 20 of the generator 16.

In another preferred embodiment of the present invention, the generator 16 is formed from a rod of solid fused quartz having an initial diameter of 2 mm or larger. It will be clear to a person skilled in the art that these dimensions are solely exemplary. As mentioned above, the generator 16 can be made of a glass having characteristics similar to those of the glass fiber 10.

Two pieces of piezoelectric material 26 and 28, typically PZT transducers, are preferably bonded to the second end 20 of the generator 16 in a manner well known to the art. These transducers 26 and 28 are mounted on the large diameter end portion 18 of the generator 16.

Practically, the generator 16 is preferably formed of two halves. The edges of these two halves are bonded together with an appropriate adhesive after the fiber 10 is located in the tip of aperture 22 formed by the two halves. In the embodiment represented in FIG. 1, the distal transducers 26 and 28 are formed on the large diameter end 18 of the two halves of the generator 16. Each of the distal transducers 26 and 28 preferably has the shape of a semi-circle. These two distal transducers are thus bonded together with a space therebetween so as to suppress any influence from one distal transducer on the other.

Figure 2:
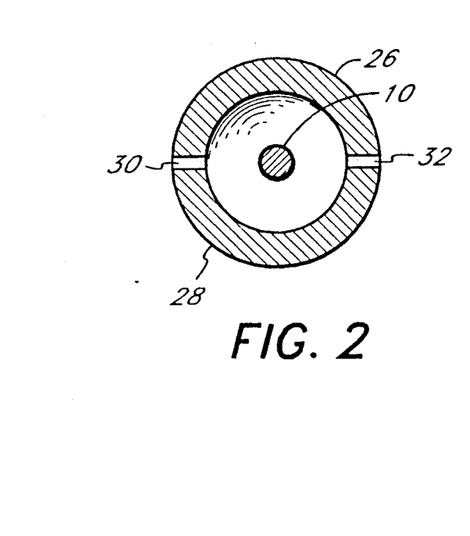
FIG. 2 is a cross-section of the large end portion of the generator used in the preferred embodiment of the present invention along the cross-section line aa in FIG. 1.

Reference is now made to FIG. 2 which is a cross-section of the large end portion 18 of the generator 16, along the cross-section line aa in FIG. 1. The two distal transducers 26 and 28 have a semi-circular shape and are preferably bonded to the generator 16. Gaps 30 and 32 are formed between the distal transducers 26 and 28 so that the distal transducers 26 and 28 are not electrically and/or mechanically connected together.

Referring now again to FIG. 1, the distal transducers 26 and 28 are preferably shear transducers or longitudinal transducers comprising PZT (lead-zirconium-titanate), lithium niobate ($LiNbO_3$) or another piece of piezoelectric material. The fiber 10 may advantageously have a small portion of its outer cladding removed to form a flat surface on which rests the tip portion 22 of the generator 16, to thereby provide additional mechanical contact between the generator 16 and the fiber 10. The fiber 10, as mentioned above, is secured to the generator 16 by a low temperature melting glass having a hardness similar to that of the fiber 10, or by an epoxy or other securing means.

Figure 3:
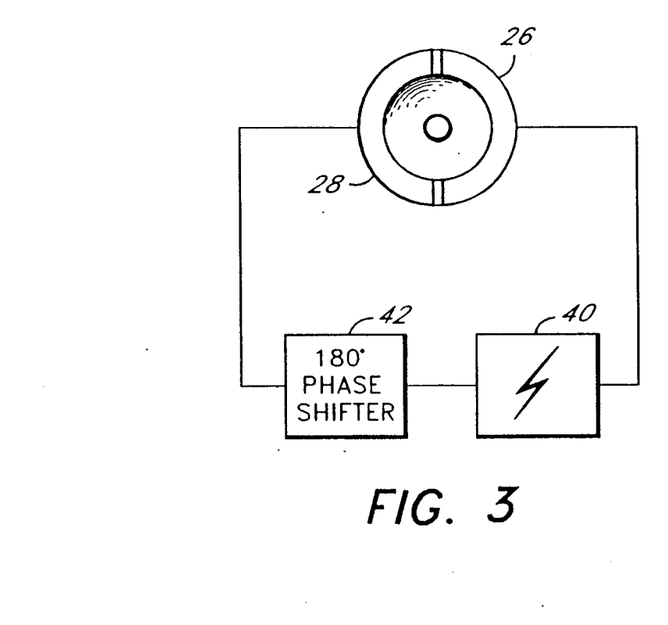
FIG. 3 illustrates the electrical circuit used in the preferred embodiment of the present invention to drive the distal transducers mounted on the generator.

Reference is now made to FIG. 3, which shows that the distal transducers 26 and 28 are driven by an electrical signal source 40, which in the preferred embodiment, is an AC source. When activated by the source 40, the distal shear transducer 26 operates in the shear mode. If a longitudinal transducer is used, the transducer operates in the longitudinal mode. The distal transducer 28 is also connected to the electrical source 40 via a 180° phase shifter 42. The distal transducer 28 is therefore excited in opposition of phase with respect to the distal transducer 26. This arrangement generates two acoustic waves in alternation at the large diameter end 18 of the generator 16. These acoustic waves may be surface acoustic waves. Each of these acoustic waves primarily propagates along the opposite surfaces of the generator to the end portion 22 of the generator 16. At the extremity of the generator 16, at the location 24, these acoustic waves are transformed into a first order flexural acoustical wave on the fiber 10.

Figure 4A:
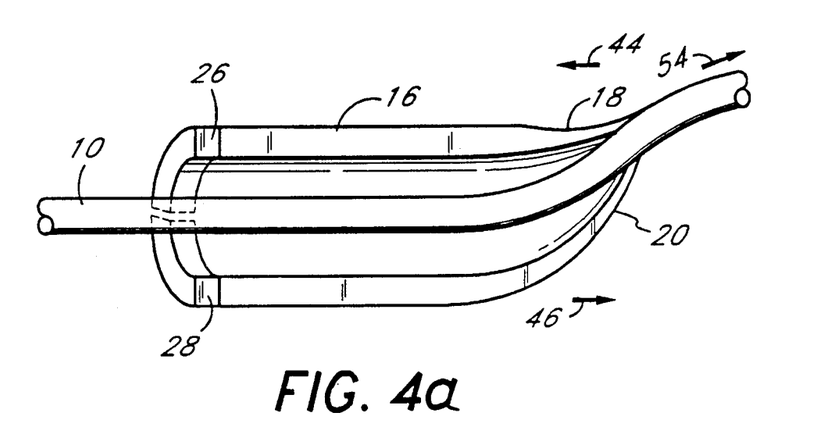
FIGS. 4a and 4b illustrate how the microbends in the optical fiber are produced using the two distal transducers mounted on the large end portion of the generator.
Figure 4B:
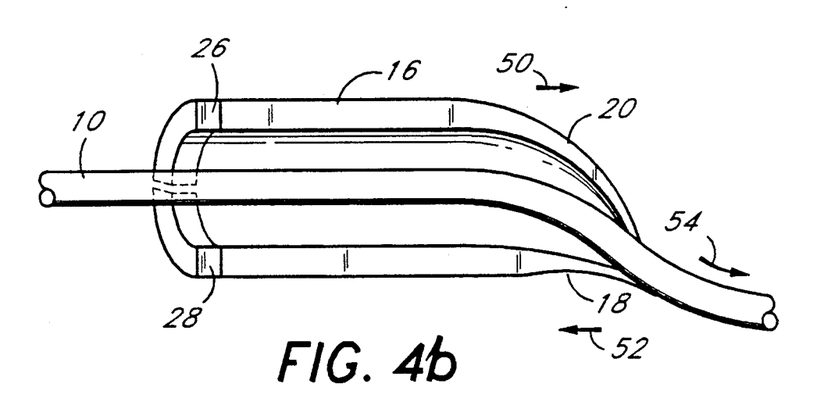

Reference is now made to FIGS. 4a and 4b, which illustrate how the first order flexural acoustical wave, or microbends are produced in the fiber 10 by means of the two acoustic distal transducers 26 and 28. When the electrical signal from the source 40 is applied to the first distal transducer 26 with a first polarity, the distal transducer 26 operates in the shear mode (respectively longitudinal mode), causing the first side to be displaced in a first direction indicated by the arrow 44. Because the distal transducer 28 is in opposition of phase with the distal transducer 26, the transducer 28 displaces the second side of the end portion 18 in a second direction, opposite to the first direction, and indicated by the arrow 46. This causes the fiber 10 to be displaced at an angle with respect to the rest position shown in FIG. 1. When the AC electrical signal applied to the distal transducers 26 and 28 reach a zero crossing, the first side and the second side of the end portion 20 return to their rest positions, as illustrated in FIG. 1, thus returning the fiber 10 to its rest position. When the AC electrical signal is applied to the distal transducers 26 and 28 with the opposite polarity to the polarity applied in FIG. 4a, the first and the second side of the end portion 20 are displaced in directions indicated by the arrows 50 and 52 in FIG. 4b. This displacement is opposite to the displacement illustrated in FIG. 4a. Thus, the fiber 10 is displaced at an angle opposite the angle of displacement in FIG. 4a. When the AC electrical signal again reaches a zero crossing, the first side and the second side of the end portion 20 return to their rest positions and the fiber 10 thus returns to its rest position, as illustrated in FIG. 1. A person skilled in the art will recognize that the return of the end portion 20 actually occurs slightly after the zero crossing of the AC electrical signal because of the acoustic propagation delay. In the preferred embodiment, the AC electrical signal is applied to the distal transducers 26 and 28 so that the fiber 10 is periodically displaced to thereby induce a flexural wave in the fiber 10 which propagates as a series of traveling microbends along the length of the fiber 10 away from the generator 16. The traveling microbends have a frequency that is determined by the frequency of the AC source 40.

In the present invention, the generator 16 acts as a damper around the fiber 10. Thus, any flexural wave which travels away from the generator 16 in the direction towards the distal transducers 26 and 28, also referred to as the reverse direction, is suppressed. Therefore, the flexural waves travel away from the distal transducers 26 and 28 in one direction only, as indicated by the arrow 54 in FIGS. 1, 4a and 4b.

Figure 8:
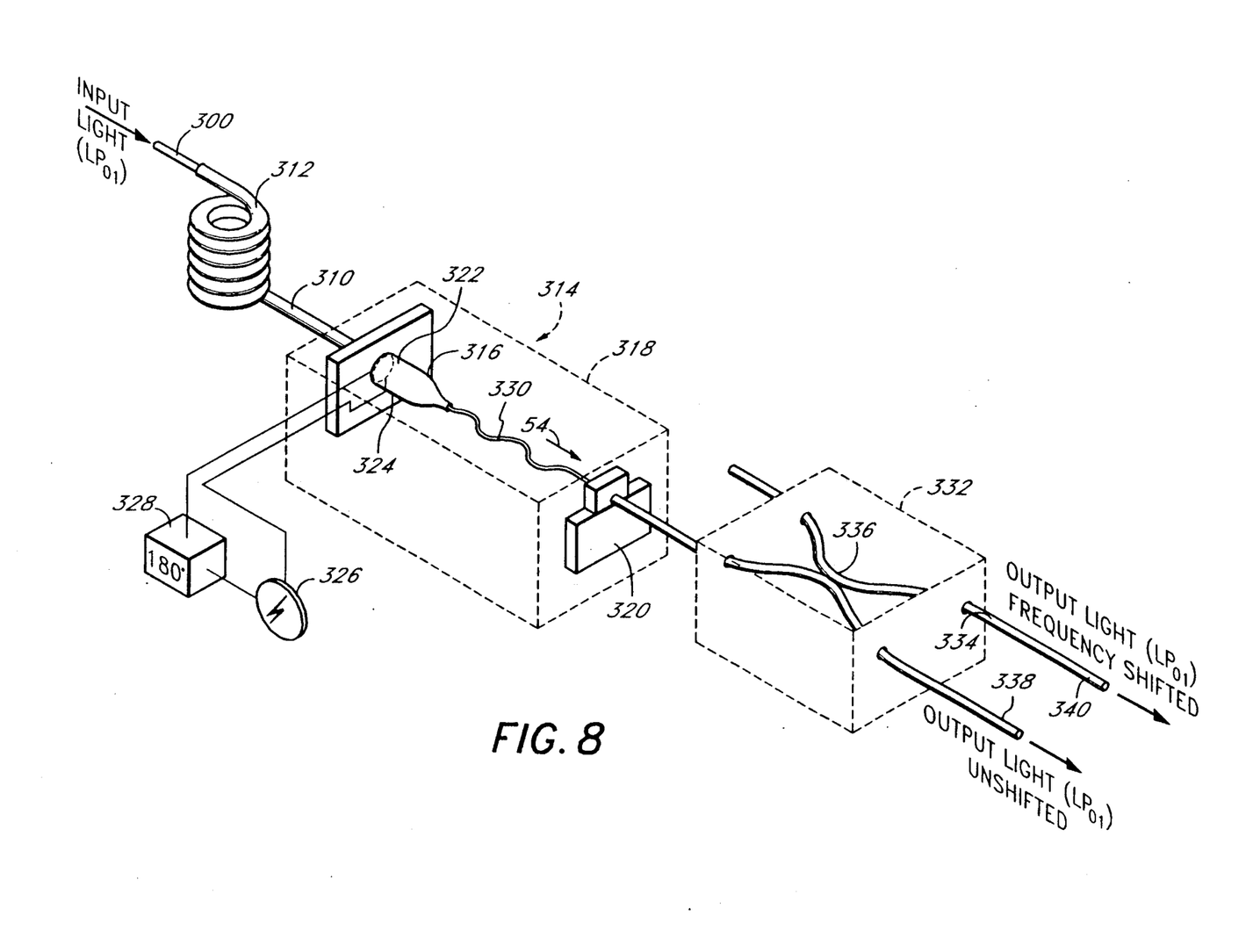
FIG. 8 illustrates the present invention as used in an intermodal frequency shifting modulator.

The present invention may also include a second damper formed of damping material through which the fiber 10 passes to thereby suppress any further propagation of the traveling microbends so that the microbends have no further effect beyond the second damper. The second damper may be positioned so that only a selected length of the optical fiber 10 is affected by the traveling microbends. In some applications, in which a long interaction length may be desired, the second damper may not be necessary as the traveling microbend wave will be attenuated by the lengths of the fiber 10. A second damper is illustrated in FIG. 8 and designated by the numeral 320, and in FIG. 5 by the numeral 74.

The frequency of the electrical signal applied to the distal transducers 26 and 28 is chosen so that the flexural wave thus produced has a wavelength along the fiber which is substantially equal to the beat length L of the optical fiber 10. Thus, as discussed above, the coupling of optical energy from one propagation mode to the other propagation mode will be reinforced as the optical signal transverses the section of fiber in which the flexural wave is propagating. In this embodiment, the microbends in the fiber 10 propagate along the length of the fiber 10 at a phase velocity $v_p$. The propagation velocity $v_p$ is determined by the particular characteristics of the fiber 10. The frequency of the electrical signal applied to the distal transducers 26 and 28 (referred to hereinafter as $f_a$) is selected so that the wavelength (referred to hereinafter as $\lambda_a$) of the propagating microbend is substantially equal to the beat length L of the fiber 10. Since the frequency $f_a$ is equal to the velocity $v_p$ divided by the wavelength $\lambda_a$, the frequency $f_a$ is determined by:

$$f_a = v_p/\lambda_a v_p/L$$

The angular frequency $\omega_a$ of the electrical signal is $\omega_a = 2\pi f_a$.

As discussed above, the propagation of an acoustic wave in an optical fiber may enable light traveling in a first propagation mode to be coupled to a second propagation mode, with a shift in frequency. Thus, an optical signal, illustrated as an arrow 14 in FIG. 1 and having an input angular frequency $\omega_0$, exits from the second end portion 56 of the fiber 10 with an angular frequency $\omega_s$, which is shifted in frequency from the angular frequency $\omega_0$ which was input at the first end portion 12 of the fiber 10. The frequency $\omega_s$ is equal to the angular frequency $\omega_0$ plus or minus the angular frequency $\omega_a$ of the signal applied to the distal transducers 26 and 28 (that is, $\omega_s = \omega_0 \pm \omega_a$). Whether the frequency $\omega_a$ is added to or subtracted from the frequency $\omega_0$ is determined by whether the signal is input in the first order $LP_{01}$ mode or the second order $LP_{11}$ mode, and whether or not the optical signal is propagating in the same direction as the propagating microbend. The embodiment represented in FIG. 1 is bidirectional insofar as the optical signal $\omega_0$ can be introduced into the second end portion 56 and thereby be caused to propagate towards the first end portion 12 in a direction opposite the direction of propagation of the traveling microbend.

These frequency shifting principles have been discussed at length in the aforementioned U.S. patent application Ser. No. 048,142, filed May 11, 1987. As set forth in the Risk article, when a traveling acoustic wave stresses a birefringent single-mode optical fiber having an optical signal propagating therein in the same direction as the traveling acoustic wave, the frequency of the traveling acoustic wave is subtracted from the frequency of the optical signal if the optical signal is initially traveling in the slow optical mode (a first polarization mode in the Risk article). On the other hand, if the optical signal is initially traveling in the fast optical mode (a second polarization mode in the Risk article), the frequency of the acoustic wave is added to the original frequency $\omega_0$ of the optical signal. A similar effect occurs when the fiber is flexed by the traveling microbend having a frequency $\omega_a$ in the present invention. Thus, the light input in the slow $LP_{01}$ optical mode at the frequency $\omega_0$ is coupled from the slow $LP_{01}$ optical mode to the fast $LP_{11}$ optical mode and is downshifted in frequency by an amount of $\omega_a$ to a frequency $\omega_{11} = \omega_0 - \omega_a$. On the other hand, light in the fast $LP_{11}$ initially input at the frequency $\omega_0$ in the fast $LP_{11}$ optical mode is upshifted in frequency. This the light input in the fast $LP_{11}$ optical mode at the frequency $\omega_0$ is shifted upward in frequency by an amount $\omega_a$ to a frequency $\omega_{01}$ (that is, $\omega_{01}=\omega_0+\omega_a$) in the $LP_{01}$ optical mode.

The effect of the traveling microbend on the optical signal when the traveling microbend propagates in the opposite direction as the optical signal is simply the reverse. In this case, an optical signal input at the frequency $\omega_0$ in the fast $LP_{11}$ optical mode is shifted to the slow $LP_{01}$ optical mode. The coupling from the fast $LP_{11}$ optical mode to the slow $LP_{01}$ optical mode thus causes a downshift in the frequency from the original frequency $\omega_0$ to the frequency $\omega_{11}$ ($\omega_{11}=\omega_0-\omega_a$). Similarly, when the light initially travels in the slow $LP_{01}$ optical mode, the light is coupled to the fast $LP_{11}$ optical mode. The coupled light thus has a frequency $\omega_{01}$ ($\omega_{01}=\omega_0+\omega_a$). A mathematical explanation of the foregoing physical phenomenon can be found in the aforementioned U.S. patent application Ser. No. 048,142.

The frequency of the AC signal modulation applied to the distal transducers 26 and 28 can be varied over a relatively broad range in the present invention. The broad range of modulation frequencies results from two features of the present invention. The first feature of the present invention that provides for operation over a broad modulation frequency range is that it couples optical energy between the spatial propagation modes. The beat length of the two spatial propagation modes is substantially smaller than the beat length between the polarization modes of an optical signal at the same frequency. Thus, the present invention operates at a higher absolute modulation frequency than an exemplary device which couples optical energy between polarization modes. The present invention can operate with optical beat lengths of approximately 50 μm to 1 mm and thus can operate with a microbend frequency of approximately 3 MHz to 30 MHz.

The second feature of the present invention that provides for operation over a broad modulation frequency range is that the modulation energy from the distal transducers 26 and 28 is coupled directly into the fiber 10 to induce the traveling, periodic microbend wave. The present invention does not require a substrate or another medium external to the fiber 10 to conduct the modulation energy to the fiber 10. Thus, a relatively large percentage of the modulation energy acts upon the fiber 10 to create the traveling microbend wave. Therefore, for a given modulation energy input, it is believed that a larger percentage of the optical energy is transferred from one spatial propagation mode to the other spatial propagation mode in each beat length. Thus, relatively fewer beat lengths of interaction between the optical signal and the traveling microbend wave are required to couple substantially all of the optical energy from one spatial propagation mode to the other spatial propagation mode. It has been shown that coupling between the spatial propagation modes will occur even when there is a small percentage of deviation from the modulation wavelength which corresponds exactly with the beat length of the two spatial propagation modes, so long as the deviation is not allowed to accumulate to a large total percentage of deviation over a large number of beat lengths. Thus, since relatively few beat lengths are required in the present invention to couple the optical energy from one spatial propagation mode to the other spatial propagation mode, the acceptable percentage of deviation in one beat length can be relatively large (relative to a device requiring a large number of beat lengths). The relatively large percentage of acceptable deviation in wavelength combined with the relatively large absolute modulation frequency results in a relatively broad range for the modulation frequency.

Figure 5:
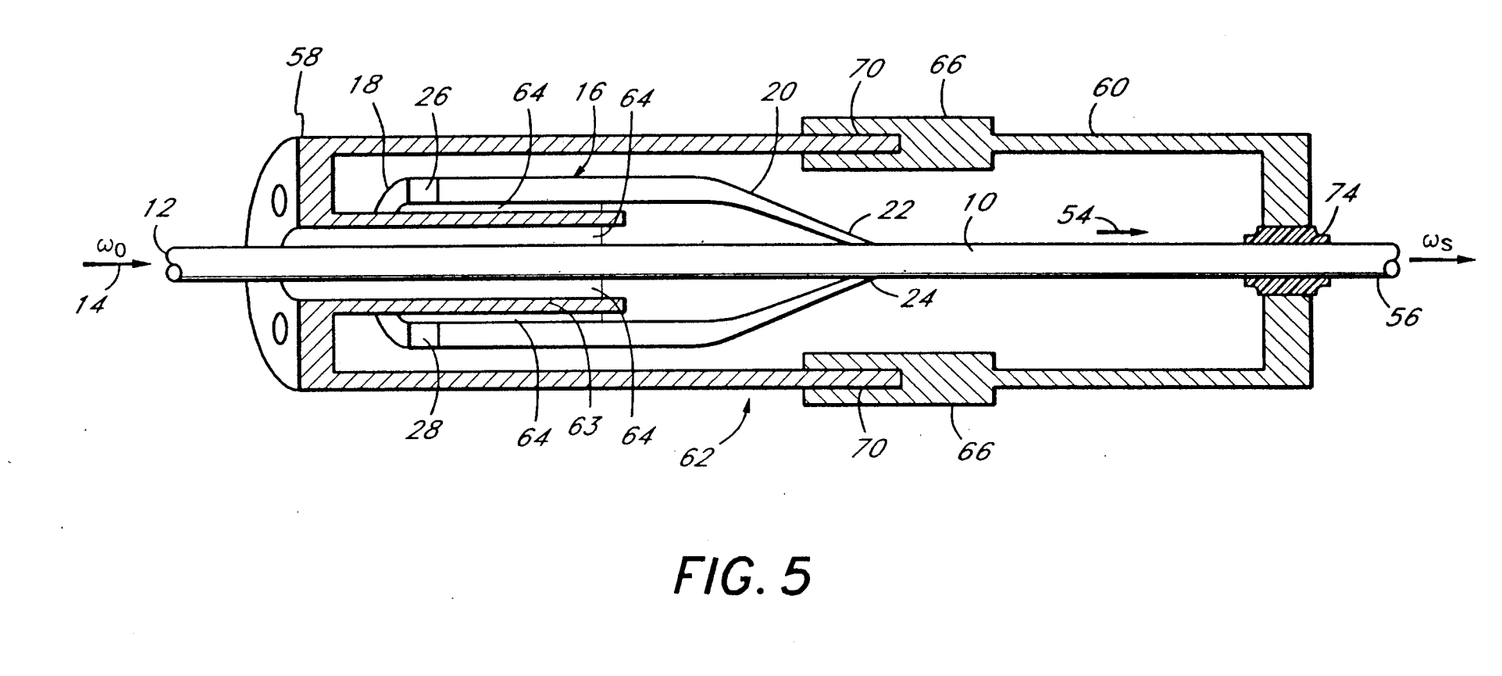
FIG. 5 illustrates how the optical fiber and the generator of the present invention are supported in a preferred embodiment of the present invention.

Reference is now made to FIG. 5, which illustrates how the optical fiber and the generator 16 are supported in a preferred embodiment of the present invention.

The optical fiber 10 can be suspended in air, vacuum or another medium between a first support block 58 and a second support block 60. The medium can be any material which does not attenuate the traveling microbend waves and which does not conduct any of the energy away from the optical fiber 10. It is not necessary that the fiber 10 be taut between the first and second support blocks 58 and 60, nor is it necessary that the fiber be straight so long as the fiber 10 is not bent with a radius sufficiently small so that the optical signal in the fiber 10 is perturbed by the bend. The first support block 58 and the second support block 60 may be two parts of a split block housing assembly, designated generally by the number 62, as shown in FIG. 5. The first support block 58 is the rear housing part of the split block housing assembly 62, whereas the second support block 60 is the front housing part of the split block housing assembly 62. The rear housing part 58 comprises an inner sleeve 63. The inner sleeve 63 projects inwardly of the rear housing part 58 at the distal end thereof. The generator 16 is designed and dimensioned to surround the inner sleeve 63, which fits snugly inside the generator 16. Preferably, the inner sleeve 63 and the generator 16 are bonded together with a bonding compound 64, inserted between the sleeve 63 and the inner diameter of the generator 16 for supporting the generator on the fiber 10. The fiber 10 is introduced inside the inner sleeve 63, and through the generator 16. The bonding compound 64 is also used to bond the inner part of the inner sleeve 63 to the fiber 10. The rear housing part 58 is lodged into a cylindrical flange 66 of the front housing part 60. This cylindrical flange 66 slides over the end portion 70 of the rear housing part 58 for supporting the two housing parts 58 and 60 together. The front housing part 60 is attached to the circumference of the fiber 10 with an appropriate bonding material 74 in the opening of the front housing part 60.

As set forth above, the generator 16 preferably comprises a hollow rod having a substantially circular cross-section throughout its length. The solid portion of the generator 16 acts as an acoustic funnel which concentrates the acoustic energy developed at the first end 18. Thus, in the example presented, if the first end 18 has a diameter of approximately 20 times the diameter of the second end 22, the acoustic energy per unit area at the second end 22 may be approximately 20 times the acoustic energy per unit area applied to the first end 18. Substantially all of the acoustic energy applied to the first end 18 is thus conducted to the second end 22 and is used to induce the traveling microbends in the fiber 10.

While the embodiments of the present invention described above employ light and an optical fiber which are matched to each other to allow propagation predominantly in the first and second order modes, the present invention may alternatively employ light and an optical fiber matched to each other to provide coupling between higher order propagation modes.

Figure 6:
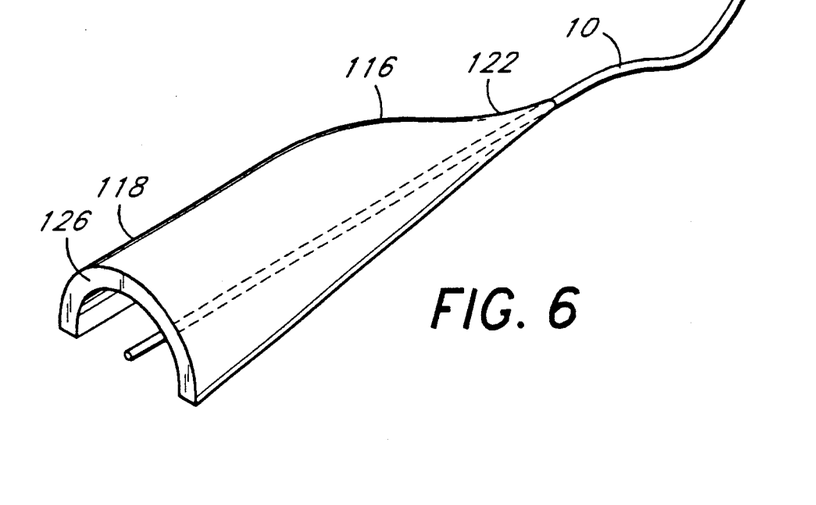
FIGS. 6 and 7 illustrate alternative embodiments of the generator of the present invention.
Figure 7:
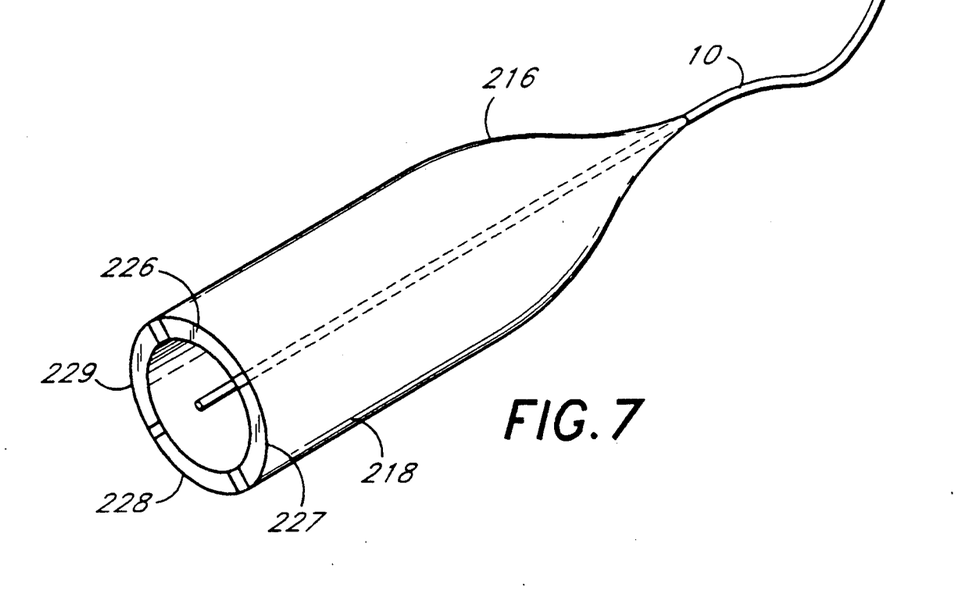

Reference is now made to FIGS. 6 and 7, which illustrate alternative embodiments of the generator of the present invention. In FIG. 6, the generator, preferably in the shape of a horn, comprises a single distal transducer 126 which is located at the larger end of a half horn section 116. The generator of FIG. 6 is simply one-half of the generator represented in FIG. 1. Thus, it can be characterized as an asymmetrical generator or asymmetrical horn. The fiber 10 is inserted through the inner diameter extremity of the half horn 116. In this embodiment, the generator 116 is driven by an AC electrical source without the use of a phase shifter. The acoustical wave, as in the previous embodiments, propagates primarily on the surface of the generator to the proximal end 122 of the generator 116 and induces a traveling flexural acoustic wave in the fiber 10. The half generator 116 essentially elongates and induces flexures in the fiber 10 in alternate directions. Although in FIG. 6, the half generator 116 has been represented with an exemplary horn-like shape, it shall be understood that the asymmetrical generator may also take other configurations.

Reference is now made to FIG. 7 which illustrates a generator 216 comprising a plurality of distal transducers 226, 227, 228 and 229. The generator 216 of FIG. 7 also has the shape of a horn. The distal transducers 226-229 are mounted on the large diameter end portion 218 of the transducer 216. As in the generator 16 represented in FIG. 1, the distal transducers 226-229 are excited so as to generate acoustic waves on the surface of the generator which induce traveling flexural acoustic waves on the fiber 10. In order for a generator comprising a plurality of distal transducers to be operative, these distal transducers are preferably in a prescribed phase relationship so as to induce acoustic waves on the fiber 10. For instance, the distal transducers 226-229 can be excited by an AC electrical source at regular intervals spaced from one another by a 180° phase shift. More specifically, two adjacent transducers, such as transducers 226 and 227, are driven by an AC signal. The other pair of adjacent transducers, such as transducers 228 and 229, are driven by the same AC signal in a prescribed phase relationship with respect to the other pair of transducers. This phase shift is preferably a 180 degrees phase shift. Although in FIG. 7, four distal transducers have been represented, it will be clear to the person skilled in the art that a different number of distal transducers can be selected, for instance, three, five, etc. It may be also more efficient to vary the amplitudes for each of the transducers or pairs of transducers.

As set forth above, the generators 16 and 216 represented in FIGS. 7 and 1 can be made of two halves bonded together with an appropriate adhesive after the fiber has been located in the tip of the aperture formed by the two halves. However, in another embodiment of the present invention, the generator of FIG. 7 or FIG. 1 can be formed from a single piece of material so that it is continuous, with the fiber being passed through the opening and bonded to the tip of the generator. As set forth above, the tip of the generator may be bonded to the circumference of the fiber with a low temperature melting glass having a hardness similar to that of the fiber. Alternatively, the generator may be formed of an appropriate glass such that the tip thereof may be slowly melted and fused to the fiber.

In one embodiment of the present invention, the dimensions of the generator may be selected to be as follows: large diameter of the generator 4-12 mm; total length of the generator 30-50 mm; distance between the tip of the generator and the second damper 5-15 mm. It will be clear to a person skilled in the art that these dimensions are solely exemplary.

FIG. 8 illustrates the present invention as used in an intermodal frequency shifting modulator. The modulator comprises an input optical fiber 300, which is preferably a single mode optical fiber propagating input light only in the first order $LP_{01}$ propagation mode. The input fiber 300 is coupled to a second fiber 310 by fusion-splicing or other known methods. The second fiber 310 is preferably a multimode fiber, and more preferably, a double mode fiber. The second fiber 310 is formed into a mode stripper 312, which is advantageously a series of tightly wound turns of the fiber 310. As is well known in the art, a mode stripper formed in this manner will cause any residual light in a higher order mode, for instance, the $LP_{11}$ mode, to be radiated from the fiber in the turns. Thus, substantially all of any light which may enter the fiber 310 in the $LP_{11}$ mode from the fiber 300 will be eliminated in the mode stripper 312. Alternative types of mode strippers can also be advantageously used to remove any optical energy traveling in the $LP_{11}$ mode. The multimode fiber 310, on the other end of the mode stripper 312, then passes to an intermode frequency shifter 314, built in accordance with the present invention.

In the embodiment illustrated in FIG. 8, the intermode frequency shifter comprises a generator 316 and a split housing assembly 318. The fiber 310 first passes through the generator 316 which inherently generates unidirectional flexural acoustic waves in the fiber. Vibrations can be reduced or suppressed by filling the generator with damping material. The intermode frequency shifter 314 further comprises a second damper 320 which prevents the vibrations induced into the length of the fiber 310 from passing beyond the interfrequency shifter 314. The generator 316 is identical to the generator previously described in the preferred and alternate embodiments of the present invention. In particular, the generator 316 exemplarily comprises two distal transducers 322 and 324, driven by an AC signal source 326. The electrical circuit further comprises a phase shifter 328 for introducing a 180° phase shift between the signals driving the distal transducers 322 and 324. The optical fiber 310 is thus connected to the generator 316 so that mechanical movement of the distal transducers 322 and 324 is coupled to the fiber 310 to cause microbends to propagate in the fiber 310, away from the generator 316, along a length 330 of the fiber 310. Thus, an optical signal within the fiber 310 in the $LP_{01}$ mode is coupled to the $LP_{11}$ mode, as described above.

After passing through the intermode frequency shifter 314, the fiber 310 then passes through a fiber optic mode selector 332 for multimode signals, such as that described in co-pending U.S. patent application Ser. No. 820,411, entitled "Fiber Optic Mode Selector," filed on Jan. 17, 1986 and assigned to the same assignee. This application is hereby incorporated herein by reference. As described in the co-pending application, in the mode selector 322, only that light which is propagating in the second order $LP_{11}$ mode is coupled out of the double-mode fiber 310 into a juxtaposed adjacent single-mode fiber 334 at an interaction region 336. The fiber 332 is selected so that an optical signal propagating in the $LP_{01}$ mode in the fiber 334 has a phase propagation velocity which matches the phase propagation velocity of the light propagating in the $LP_{11}$ mode in the fiber 310. Any light remaining in the first order $LP_{01}$ mode remains in the fiber 310 and exits from a second end 338 of the fiber 310 as light in the original unshifted frequency. The light coupled to the single-mode optical fiber 334 exits from an end 340 of the fiber 334 as frequency shifted light in the first order $LP_{01}$ mode of the fiber 334. The frequency of the light which exits from the end 340 of the fiber 334 is equal to the frequency of the light which was input into the single mode fiber 300 in the first order $LP_{01}$ mode minus the frequency of the acoustic signal applied to the transducer 316 in the intermode frequency shifter 314.

The AC signal applied to the generator 316 by the AC signal source 326 can be varied in frequency, thereby varying the frequency of the optical signal that exits from the end 340 of the fiber 334. The amplitude of the AC signal applied to the generator 316 can be varied to vary the percentage of light coupled from the $LP_{01}$ mode to the $LP_{11}$ mode in the frequency shifter 314 and thus vary the amplitude of the optical signal that exits from the end 340 of the fiber 334.

The system of FIG. 8 is reciprocal. An optical signal can be introduced into the end 340 of the optical fiber 334 so as to propagate towards the interaction region 336 of the mode selector 332 in the $LP_{01}$ propagation mode. The mode selector 332 operates reciprocally so that the optical signal in the $LP_{01}$ mode in the fiber 334 is coupled to the $LP_{11}$ mode in the fiber 310. The optical signal then propagates in the $LP_{11}$ mode from the interaction region 336 towards the frequency shifter 314 and thus propagates to the length 330 of the fiber 310 in which the traveling microbends are propagating. The optical signal propagates through the length 330 of the fiber 310 in a direction opposite the direction indicated by the arrow 54 and thus propagates in the direction opposite the direction of propagation of the traveling microbends. Thus the optical signal traveling in the $LP_{11}$ mode is coupled to the $LP_{01}$ mode and is shifted down in frequency. The optical signal then passes through the mode stripper 312 wherein any optical signal remaining in the $LP_{11}$ mode is stripped from the fiber, leaving only the optical signal propagating in the $LP_{01}$ mode at the shifted frequency to be coupled to the single mode fiber 300 which, in this example, serves as an output fiber.

The embodiment of FIG. 8 can be used to shift an optical signal upward in frequency by locating the generator 316 proximate to the damper 320, thus causing the traveling microbends to travel in the length 330 of the fiber 310 in a direction opposite the direction indicated by the arrow 54. Thus, light input into the single mode fiber 300 and propagating toward the single mode fiber 334 will be shifted upward in frequency. Light input into the single mode fiber 334 and propagating towards the single mode fiber 300 will be shifted upward in frequency.

Other alternative embodiments of the present invention have been thoroughly discussed and disclosed in the aforementioned prior patent applications. In particular, the optical fiber 10 of FIGS. 1–8 (respectively, optical fiber 310) may not have uniform outer cladding diameters. Rather, the optical fiber 10 (respectively, 310) may have a plurality of sections having differing outer cladding diameters. The fiber 10 (respectively, 310) may thus have a gradual taper in the outer diameter cladding of the fiber from the relatively large outer diameter to a relatively small outer diameter. This provides selective shifting of the frequency of an optical signal propagating the fiber 10 (respectively, 310) by one of a plurality of acoustic frequencies while maintaining optimum or near optimum acousto-optic coupling efficiency.

Various embodiments of the generator 16 have also been disclosed in the aforementioned patent applications. Two acoustic generators were disclosed in these patent applications. The first one is constructed from a solid, cylindrical section of glass rod. In such a generator, acoustic waves excited in the large diameter end of the tapered transducer are transformed into longitudinal waves at the small diameter end. However, in this acoustic generator, in addition to the desired primary longitudinal mode, resonant effects are also observed at the small end of the generator.

Another type of generator was disclosed in which the resonant effects are suppressed. This generator is drawn from a silica glass tube, such that the generator is hollow in the center from the large diameter base to the neck at the end of the transition region. Suppression of the resonant effects can be performed by filling the hollow region with acoustic damping material. The hollow region can also be filled with a heat sink to limit any temperature fluctuations throughout the generator.

Alternative embodiments of the present invention comprise different types of optical fibers of differing diameters along the length of the fiber. These embodiments have been disclosed in the aforementioned U.S. patent application Ser. No. 048,142. The section of an optical fiber in such an alternate embodiment is comprised of an arbitrary number of portions. The advantages of such a configuration is that the acoustic wave damper 320 is no longer needed along the fiber at the end of the section 330 (FIG. 8) because no substantial acousto-optic interaction occurs outside the region of the second portion and the third portion of the optical fiber. A smooth variation of the fiber radius over the total interaction region can also be envisioned in another embodiment of the present invention. In this embodiment, the diameter of the fiber gradually varies from a larger diameter at a first portion, where the fiber is coupled to the acoustic generator, to a smaller diameter at a location away from the acoustic generator. Precise matching of the beat length and the acoustic wavelength is thus not necessary as long as complete coupling is accomplished within a few beat lengths of the fiber. This minimizes the phase mismatch error created by the mismatch in the acoustic wavelength with a fiber beat length in the coupling region.

The optimum angle of the taper, or rate of change of fiber radius as a function of length along the fiber longitudinal axis, may be theoretically calculated or determined by an empirical process. This process would include measuring the coupling efficiency for a number of different taper angles for a fixed acoustic frequency and selecting the angle which produces the maximum coupling efficiency.

As mentioned in the above-referenced prior patent applications, an elliptical core fiber can also be used. This allows it to resolve the degeneracy of the orthogonal lobe orientations of the $LP_{11}$ modes. Ellipticity in the shape of the core of the double mode fiber used for frequency shifting has shown to have a marked effect on the output signal from the device, as disclosed in U.S. patent Ser. No. 48,142, filed on May 11, 1987 and assigned to the same assignee as the present invention.

While preferred embodiments of this invention have been disclosed herein, those skilled in the art will appreciate that changes and modifications may be made therein without departing from the spirit and scope of this invention, as defined in the appended claims.

We claim:

1. An apparatus for coupling optical energy between optical propagation modes in an optical fiber, comprising:
   an optical fiber having a longitudinal axis, said optical fiber supporting a first optical propagation mode and a second optical propagation mode for an optical signal propagating therein; and
   a generator connected to said fiber such that said generator produces a flexural wave which propagates in said optical fiber, the energy of said flexural wave confined to said optical fiber, said flexural wave having a frequency, a propagation velocity and a wavelength, said wavelength of said flexural wave being a function of said frequency and said propagation velocity, and being selected to cause coupling of light from one of said modes to the other of said modes, said generator of said flexural wave having a longitudinal axis substantially coaxial with the longitudinal axis of said optical fiber.

2. The apparatus as defined in claim 1, wherein said generator comprises a single transducer.

3. The apparatus as defined in claim 1, wherein said generator of said flexural wave comprises a plurality of transducers.

4. The apparatus as defined in claim 1, wherein said generator comprises an elongated member having a first end mechanically coupled to said optical fiber and having a second end disposed away from said first end, said second end being mounted around said optical fiber, said second end having at least one transducer distally disposed thereon, said transducer being responsive to an electrical signal applied thereto to generate an acoustic wave which propagates from said second end of said member to said first end of said member to thereby induce said flexural wave in said optical fiber.

5. The apparatus as defined in claim 4, wherein said second end of said member is larger than said first end of said member so that the acoustic energy per unit area applied to said optical fiber is greater than the acoustic energy per unit area excited in said second end of said member by said transducer.

6. The apparatus as defined in claim 4, wherein said transducer excites an acoustic wave at said second end, said member converting the energy of said acoustic wave to provide a flexural acoustic wave at said first end of said member.

7. The apparatus as defined in claim 4, wherein said member comprises a cylinder which is hollow at said second end and is solid at said first end, the transition between said hollow end and said solid end being a smooth and gradual taper.

8. The apparatus as defined in claim 4, wherein said member comprises damping material, said damping material surrounding said optical fiber and suppressing said flexural acoustic wave in a direction opposite the direction of propagation of said optical signal.

9. The apparatus as defined in claim 8, wherein said member is substantially collinear with said optical fiber, said member being mounted so that said member suppresses any acoustic wave propagating in said opposite direction.

10. The apparatus as defined in claim 4, further comprising a split block housing assembly, said housing assembly comprising a rear housing part and a front housing part, said rear housing part comprising an inner sleeve, said inner sleeve surrounded by the inner surface of said generator at said second end, said front housing part being removably mounted on said rear housing part.

11. The apparatus as defined in claim 10, wherein said generator and said fiber are supported coaxially by said split block housing assembly.

12. The apparatus as defined in claim 11, wherein said front housing part is bonded to said fiber by means of an adhesive.

13. The apparatus as defined in claim 4, wherein said member comprises two transducers distally mounted on said second end of said member.

14. The apparatus as defined in claim 13, wherein said distally mounted transducers are driven in opposition of phase by an electrical source.

15. The apparatus as defined in claim 2, wherein said transducer is driven by an AC electrical source.

16. The apparatus as defined in claim 3, wherein said plurality of transducers is driven by an electrical source at intervals selected so as to induce a flexural wave in said optical fiber.

17. The apparatus as defined in claim 4, wherein said member is formed from a single piece of material.

18. The apparatus as defined in claim 1, additionally comprising a damper, mechanically coupled to said optical fiber to prevent reflection of said flexural wave traveling in said optical fiber.

19. The apparatus as defined in claim 1, wherein said optical fiber includes a portion in which the diameter of the cladding of said optical fiber decreases from a larger diameter to a smaller diameter, said generator being coupled to said fiber at a location thereon at which the cladding diameter is sufficiently large to prevent coupling of light at said location.

20. The apparatus as defined in claim 1, wherein said generator includes means for adiabatically transforming said acoustic waves so as to excite a flexural wave in said fiber, said flexural wave causing coupling of light between said modes.

21. The apparatus as defined in claim 1, wherein said cross-section of said fiber varies in discrete increments.

22. The apparatus as defined in claim 4, wherein said one transducer comprises a piece of piezoelectric material.

23. The apparatus as defined in claim 1, wherein said optical fiber is a multimode optical fiber or a birefringent single-mode fiber.

24. The apparatus as defined in claim 1, wherein said optical energy, traveling in said first propagation mode at a first optical frequency in a first phase propagation velocity is coupled to said second propagation mode at a second optical frequency and a second propagation velocity so that said second frequency is substantively equal to either the sum or difference of said first optical frequency and said frequency of said flexural wave.

25. The apparatus as defined in claim 24, wherein said second optical frequency is equal to said first optical frequency plus said frequency of said flexural wave when said optical signal propagates in the same direction as said flexural wave and said first phase propagation velocity is greater than said second phase propagation velocity, and said second optical frequency is equal to said first optical frequency minus said frequency of said flexural wave when said optical signal propagates in the same direction as said flexural wave and said first phase velocity is less than said second phase velocity.

26. The apparatus as defined in claim 4, wherein said first end of said member is bonded to the circumference of said optical fiber with a low temperature melting glass having substantially a hardness similar to that of said optical fiber.

27. The apparatus as defined in claim 4, wherein said generator is made of a material such as glass, such that said first end of said generator may be slowly melted and fused to the circumference of said fiber.

28. The apparatus as defined in claim 3, wherein said transducers are separated from one another so as not to be electrically or mechanically connected together.

29. The apparatus as defined in claim 1, wherein said generator has the shape of a horn.

30. The apparatus as defined in claim 6, wherein said acoustic wave excited by said transducer at said second end is a surface acoustic wave.

31. A method of coupling optical energy between optical propagation modes in an optical fiber, comprising the steps of:
inputting an optical signal into an optical fiber having first and second optical propagation modes for signals propagating therein, said optical signal having a longitudinal axis;
propagating a flexural wave within said optical fiber, said flexural wave having a frequency, propagation velocity and wavelength within said fiber, said wavelength within said fiber being determined by said frequency and said propagation velocity, said wavelength being selected so that a portion of said optical energy propagating in one of said propagation modes is coupled to said other propagation mode: and
exciting said flexural wave by propagating acoustic energy in a direction substantially parallel to the longitudinal axis of said fiber.

32. The method as defined in claim 31, further comprising the step of suppressing propagation of said acoustic wave in said optical fiber in a direction opposite to the direction of propagation of said optical signal.

33. The method as defined in claim 31, wherein the step of inducing said acoustic wave comprises the step of inducing a surface acoustic wave.

34. A method of manufacturing a fiber optic frequency shifter comprising the steps of:
providing an optical fiber;
surrounding a portion of said optical fiber with an acoustic medium;
mounting and orienting acoustic transducers on said acoustic medium to generate an acoustic wave in said acoustic medium; and
driving said transducers on said acoustic medium so as to cause said acoustic wave to propagate in a direction substantially parallel to the longitudinal axis of said fiber, to thereby produce a flexural wave in said optical fiber.

* * * * *

UNITED STATES PATENT AND TRADEMARK OFFICE
CERTIFICATE OF CORRECTION

PATENT NO. : 5,022,732

DATED : June 11, 1991

INVENTOR(S) : Helge E. Engan, Byoung Y. Kim, James N. Blake and Herbert J. Shaw

It is certified that error appears in the above-identified patent and that said Letters Patent is hereby corrected as shown below:

At column 10, line 67, change "lightin" to --light--.

At column 10, line 67, delete "the fast $LP_{11}$".

At column 10, line 69, change "This" to --Thus--.

Signed and Sealed this

Twenty-fifth Day of May, 1993

Attest:

MICHAEL K. KIRK

Attesting Officer

Acting Commissioner of Patents and Trademarks